Nov. 16, 1943.  W. AARON  2,334,235
ADAPTER FOR ROTARY CLOTH CUTTING MACHINE BLADES
Filed June 22, 1943
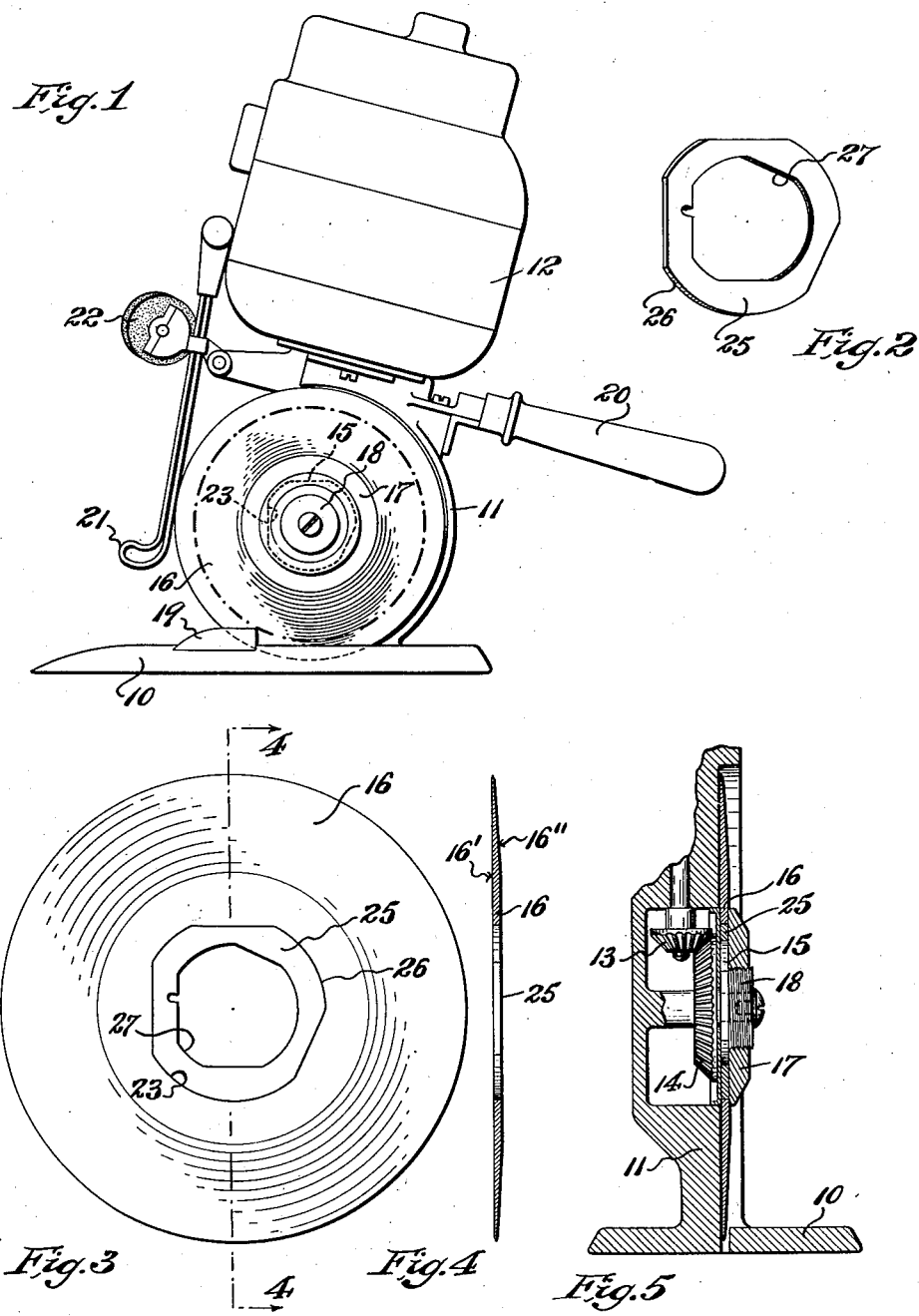
INVENTOR.
William Aaron,
BY George D. Richards
Attorney Patented Nov. 16, 1943

2,334,235

UNITED STATES PATENT OFFICE 2,334,235

ADAPTER FOR ROTARY CLOTH CUTTING MACHINE BLADES

William Aaron, Brooklyn, N. Y.

Application June 22, 1943, Serial No. 491,775

5 Claims. (Cl. 30—347)

This invention relates to cloth-cutting machines of the rotary blade type; and the invention has reference to a novel construction of adapter for mounting discarded worn blades of relatively large size machines in smaller size machines, thereby to prolong the useful life of the blades.

Cloth-cutting machines of the rotary blade type comprise a base having an upstanding standard, a motor and blade driving means actuated by the motor. The blade in such machine comprises a circular steel disk having an inner flat face and an outer beveled face; the periphery of the blade being sharpened to form a cutting edge. The blade body is usually provided with a non-symmetrical hub receiving aperture, which corresponds in size and peripheral shape to a like non-symmetrical blade mounting hub of the blade driving means of the machine. Such hub projects from the face of the machine standard, whereby, when operatively mounted on the hub, the blade is rotated in a vertical plane, parallel to the face of said machine standard, with the lower part of the blade cutting edge portion extending through a slotted throat on the machine base. The matching non-symmetrical blade opening and mounting hub are so shaped that the blade can only be mounted in a proper relation to the standard face; i. e. with the flat side of the blade inward and closely adjacent to the standard face and the beveled side of the blade outward, whereby the flat side of the blade lies very close to the standard face, with such limited clearance that entrance of any cloth, undergoing the cutting operation, between the blade and standard is prevented.

In the use of the machine, the rotated blade is generally required to cut its way through many plies of cloth piled one upon another, and consequently the blade cutting edge eventually becomes dull and requires to be sharpened again to assure efficient cutting action thereof. The machine is therefore usually provided with blade sharpening means, such as grindstones, which may be moved at will into and out of contact with the revolving blade edge, whereby the latter may be sharpened from time to time, as necessity may require. By reason of more or less frequent sharpening of the blade, the same is gradually reduced in diameter until eventually its cutting edge no longer sufficiently enters the throat of the machine base to assure proper cutting action, and consequently the blade must be removed, discarded and replaced by a new blade of initially maximum diameter.

Cloth-cutting machines of the rotary blade type are furnished in several sizes, each taking a blade of respectively different initially maximum given diameter; e. g. some machines are sized to use a seven inch blade, others sized to use a six inch blade, still others sized to use a five inch blade, and even machines are sized to use other initial diameters of blades. Most industries making use of rotary blade cloth-cutting machines commonly employ several different sizes of machines. Since each size of machine, particularly as to standard, base and blade mounting hub, are shaped and sized proportionately for accommodation of only a given diameter of blade, and since each size of blade possesses a different size of hub receiving aperture proportionate to its initial diameter, although usually of the same peripheral shape, it follows that the worn and discarded blade of a larger size of machine cannot be applied to a smaller size of machine, notwithstanding that it may be of a diametric size otherwise suitable for use in the latter. By reason of this, worn and discarded blades must be thrown away, and their content of valuable high quality and comparatively costly steel becomes waste and is lost; a circumstance highly undesirable and wasteful at any time, but especially so in times of scarcity requiring careful conservation and full use of valuable material, such as exists, particularly, in a time of war.

Having these things in mind, it is an object of this invention to provide a novel means for application within the hub embracing aperture of a worn blade incapable of further use in a relatively large size cloth-cutting machine, whereby such blade is adapted to be operatively mounted in hub embracing relation to the driving hub of a smaller size of machine for use in the latter, thereby greatly prolonging the useful life of such blade, with consequent conservation or prevention of waste of valuable steel or other material from which the blade is made.

This invention has for a further object to provide an adapter in the form of a perforate disk of rigid material having a non-symmetrical external peripheral shape corresponding to and adapted to non-rotatably fit within the driving hub embracing aperture of a rotary blade from a relatively large size cloth-cutting machine, and a non-symmetrical internal peripheral shape corresponding to and adapted to non-rotatably embrace a driving hub of a smaller size of cloth cutting machine.

Other objects of this invention, not at this time more particularly enumerated, will be understood from the following detailed description of the same.

An illustrative embodiment of the invention is shown in the accompanying drawing, in which:

Fig. 1 is a side elevational view of a cloth-cutting machine of the rotary blade type.

Fig. 2 is a perspective view of an illustrative form of blade adapter made according to this invention.

Fig. 3 is a face view of a worn blade discarded from a relatively large size of cloth-cutting machine, to which is operatively applied the adapter shown in Fig. 2; and Fig. 4 is a sectional view, taken on line 4—4 in Fig. 3, but showing the applied adapter in edge elevation.

Fig. 5 is a fragmentary sectional view of the base, standard, and driving means of a comparatively small size cloth-cutting machine, upon the driving hub of which is mounted the adapter equipped blade of Fig. 3, said blade and adapter being shown in section, with said driving hub shown in elevation.

As illustrated in Fig. 1, which shows a conventional form of cloth-cutting machine of the rotary blade type, the machine comprises a supporting base 10 having a suitably shaped upstanding standard 11, which carries at its upper end an electric driving motor 12. Driven by the motor 12, by means of suitable transmission means, including e. g. the bevel driving and driven gears 13 and 14 (see Fig. 5), is a rotatable hub 15, which projects outwardly from the face of the standard 11, and upon which a circular cutting blade 16 is mounted, so as to be revolved thereby when the machine is in operation. The blade 16 is held to the hub 15 by a keeper ring 17, which is screwed onto an externally threaded boss 18 which projects outwardly and axially from said hub. The lower segment of the cutting edge portion of the mounted blade 16 extends below the top of the base 10, and passes through a slotted throat 19 which is fixed upon the base in front of the blade 16. The machine is manipulated by a handle 20, which projects rearwardly from the upper part of the standard 11. Depending from the forward upper part of the standard 11 is a combined blade guard and presser foot 21, which, as to its presser foot function, holds down the pile of cloth through which the revolving blade 16 is moved during operation of the machine, so that the cloth is lifted by or rides up over the throat 19 into engagement with the blade cutting edge. Also suitably supported from the forward part of the standard 11, above and in front of the blade 16, are a pair of grindstones 22 which, when use thereof is required, may be swung downward into engagement with the revolving cutting edge of the blade for the purpose of resharpening such edge.

It is common practice to form the driving hub 15 in a non-symmetrical peripheral shape, and to provide the blade 16 with a central aperture 23 of corresponding non-symmetrical peripheral shape, so that the blade can be properly mounted upon the hub 15 in only one way, i. e. with its flat side or face 16' inward and opposed closely adjacent to the face of the standard 11, and with its beveled side or face 16'' outwardly presented; this being done for reasons already above referred to.

The blade adapter device, according to this invention, comprises a perforate disk 25 of rigid material, such as steel or other suitable metal, or of hard and rigid non-metallic material. Said disk approximates in thickness the major thickness of the central body portion of a blade 16 in which the blade aperture 23 is formed, and is preferably not in excess of the latter thickness. Said disk 25 is provided with an external non-symmetrical peripheral shape 26 corresponding to and adapted to non-rotatably fit within the non-symmetrical driving hub embracing aperture 23 of a blade from a relatively large size cloth-cutting machine. Said disk 25 is further provided with an internal non-symmetrical peripheral shape 27 corresponding to and adapted to non-rotatably embrace a non-symmetrical driving hub of a comparatively smaller size cloth-cutting machine.

When a blade 16 of a relatively large size cloth-cutting machine has been ground down by required sharpening thereof from time to time, whereby its diameter is reduced to an extent which no longer permits its cutting edge to properly and sufficiently enter the slotted throat 19 of the machine, e. g. to a circumference of reduced diameter approximating that indicated by dot and dash broken line in Fig. 1, said blade is no longer capable of satisfactory use in such machine, and, so far as the latter is concerned, must be discarded and replaced by a new blade of initial maximum diameter.

Although no longer useful in the relatively large size machine, the worn and discarded blade nevertheless is capable of prolonged useful life provided it can be mounted in a smaller size machine. Such prolonged life, with the attendant advantages already referred to, may be easily attained by the use of the perforate adapter disk 25 of this invention. To this end, said adapter disk 25 is inserted within the driving hub embracing aperture 23 of the discarded blade 16, and since the external peripheral shape 26 of said adapter disk corresponds in size and conformation to the non-symmetrical shape of the blade aperture 23, said disk will fit snugly within the latter, and will so interlock therewith as to be non-rotatable therein, and consequently will be efficiently capable, when rotated, of transmitting its rotary movement to the blade 16 to which it is thus applied. Since the central opening of the adapter disk is provided with a peripheral shape which corresponds in size and conformation to the non-symmetrical driving hub of a smaller size machine, the blade 16 with the adapter disk assembled therewith may be applied upon and so as to fittingly embrace the latter driving hub in interlocked relation thereto, and so as to receive rotary motion therefrom, as shown in Fig. 5, whereupon the blade and adapter assembly may be secured in such operatively mounted relation by means of a keeper ring 17, as also shown in Fig. 5. In the use of the adapter device, all the advantage of making it impossible to mount the adapter blade in a smaller size machine any other way than a proper one is retained by the described adapter construction.

From the above it will be obvious that a blade 16 discarded from a relatively large size machine may be easily adapted to and used in a smaller size machine, and thereby a prolonged lease of useful life for the otherwise wasted blade material is attained.

Having now set forth my invention and its advantages, I claim:

1. A device for the purposes described comprising an adapter in the form of a perforate disk of rigid material having a non-symmetrical external peripheral shape corresponding to and adapted to non-rotatably fit within the driving hub embracing aperture of a rotary blade discarded from a relatively large size cloth-cutting machine, and a non-symmetrical internal peripheral shape corresponding to and adapted to non-rotatably embrace a driving hub of a smaller size cloth-cutting machine.

2. A device for the purposes described comprising an adapter in the form of a perforate disk of rigid material having a non-symmetrical external peripheral shape corresponding to and adapted to non-rotatably fit within the driving hub embracing aperture of a rotary blade discarded from a relatively large size cloth-cutting machine, and a non-symmetrical internal peripheral shape corresponding to and adapted to non-rotatably embrace a driving hub of a smaller size cloth-cutting machine, said disk being of a thickness approximating that of the apertured body portion of said blade.

3. A device for the purposes described comprising an adapter in the form of a flat disk of rigid material having a non-symmetrical peripheral edge corresponding to and adapted to interlockingly fit within a non-symmetrical driving hub embracing aperture of a rotary blade discarded from a relatively large size cloth-cutting machine, and said disk having a central opening of non-symmetrical peripheral contour conformable to and adapted to interlockingly embrace a non-symmetrical driving hub of a smaller size cloth-cutting machine.

4. A device for the purposes described comprising an adapter in the form of a flat disk of rigid material having a non-symmetrical peripheral edge corresponding to and adapted to interlockingly fit within a non-symmetrical driving hub embracing aperture of a rotary blade discarded from a relatively large size cloth-cutting machine, said disk having a central opening of non-symmetrical peripheral contour conformable to and adapted to interlockingly embrace a non-symmetrical driving hub of a smaller size cloth-cutting machine, said disk being of a thickness approximating that of the apertured body portion of said blade.

5. A device for the purposes described comprising an adapter in the form of a flat disk of rigid material having a non-symmetrical peripheral edge corresponding to and adapted to interlockingly fit within a non-symmetrical driving hub embracing aperture of a rotary blade discarded from a relatively large size cloth-cutting machine, said disk having a central opening of non-symmetrical peripheral contour conformable to and adapted to interlockingly embrace a non-symmetrical driving hub of a smaller size cloth-cutting machine, said disk being of a thickness not in excess of that of the apertured body portion of said blade.

WILLIAM AARON.